(12) United States Patent
Bernhammer et al.

(10) Patent No.: US 12,215,668 B2
(45) Date of Patent: Feb. 4, 2025

(54) WIND TURBINE COMPONENT, WIND TURBINE, AND METHOD FOR MANUFACTURING OF A WIND TURBINE COMPONENT

(71) Applicant: Siemens Gamesa Renewable Energy A/S, Brande (DK)

(72) Inventors: Lars Oliver Bernhammer, Pamplona (ES); Feng Wang, Aalborg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/028,724

(22) PCT Filed: Sep. 10, 2021

(86) PCT No.: PCT/EP2021/074930
§ 371 (c)(1),
(2) Date: Mar. 27, 2023

(87) PCT Pub. No.: WO2022/069189
PCT Pub. Date: Apr. 7, 2022

(65) Prior Publication Data
US 2023/0358206 A1 Nov. 9, 2023

(30) Foreign Application Priority Data
Oct. 1, 2020 (EP) .................................. 20199578

(51) Int. Cl.
*F03D 1/06* (2006.01)
*F03D 80/70* (2016.01)
(52) U.S. Cl.
CPC ........... *F03D 1/0675* (2013.01); *F03D 80/70* (2016.05); *F05B 2230/90* (2013.01); *F05B 2240/305* (2020.08)

(58) Field of Classification Search
CPC .... F03D 1/0633; F03D 1/0643; F03D 1/0645; F03D 1/0648; F03D 1/0649;
(Continued)

(56) References Cited

U.S. PATENT DOCUMENTS

2007/0036653 A1* 2/2007 Bak ........................ F03D 7/0232
416/98
2009/0266004 A1* 10/2009 Willey .................. B29C 70/222
264/299
(Continued)

FOREIGN PATENT DOCUMENTS

EP 2799709 A1 11/2014
EP 3020958 A1 5/2016
(Continued)

OTHER PUBLICATIONS

PCT International Search Report and Written Opinion of International Searching Authority mailed Dec. 10, 2021 corresponding to PCT International Application No. PCT/EP2021/074930 filed Sep. 10, 2021.

*Primary Examiner* — Elton K Wong
(74) *Attorney, Agent, or Firm* — Schmeiser, Olsen & Watts, LLP

(57) ABSTRACT

A wind turbine component adapted to be attached to a wind turbine, wherein the component is a cover element adapted to cover at least one part of a wind turbine or an aerodynamic element adapted to be attached to a rotor blade of a wind turbine, wherein the component includes a main body with a continuous and at least partly curved surface, wherein the main body is formed by a layer stack including a plurality of layers, wherein at least two of the layers are of a different material.

5 Claims, 3 Drawing Sheets

(58) Field of Classification Search
CPC .. F03D 1/06495; F03D 1/0675; F03D 1/0679; F03D 1/0681; F03D 1/0682; F03D 1/0685; F03D 1/0687; F03D 1/0688; F03D 1/069; F03D 80/70; F05B 2240/305; F05B 2240/3052; F05B 2230/90

See application file for complete search history.

(56) References Cited

U.S. PATENT DOCUMENTS

| | | | |
|---|---|---|---|
| 2012/0201689 A1* | 8/2012 | Fuglsang | F03D 1/0641 416/235 |
| 2012/0257977 A1 | 10/2012 | Jensen et al. | |
| 2015/0204200 A1* | 7/2015 | Eyb | F01D 5/282 416/230 |
| 2016/0369775 A1* | 12/2016 | Gonzalez | F03D 7/0236 |
| 2018/0058424 A1* | 3/2018 | Egedal | F03D 7/0224 |
| 2021/0239545 A1* | 8/2021 | Banica | A47C 7/14 |
| 2023/0115914 A1* | 4/2023 | Haag | F03D 1/0675 416/241 R |

FOREIGN PATENT DOCUMENTS

| | | |
|---|---|---|
| EP | 3279467 A1 | 2/2018 |
| WO | 2014124642 A1 | 8/2014 |
| WO | 2016206702 A1 | 12/2016 |
| WO | 2017088880 A1 | 6/2017 |

* cited by examiner

WIND TURBINE COMPONENT, WIND TURBINE, AND METHOD FOR MANUFACTURING OF A WIND TURBINE COMPONENT

CROSS-REFERENCE TO RELATED APPLICATIONS

This application claims priority to PCT Application No. PCT/EP2021/074930, having a filing date of Sep. 10, 2021, which claims priority to EP Application No. 20199578.4, having a filing date of Oct. 1, 2020, the entire contents both of which are hereby incorporated by reference.

FIELD OF TECHNOLOGY

The following relates to a wind turbine component adapted to be attached to a wind turbine, wherein the component is a cover element adapted to cover at least one part of a wind turbine or an aerodynamic element adapted to be attached to a rotor blade of a wind turbine. Furthermore, the following relates to a wind turbine and a method for manufacturing of a wind turbine component.

BACKGROUND

Modern wind turbines tend to grow in size so that also their components and/or additional components that are attachable to the wind turbine in order to enhance their performance become larger. For larger components, also their manufacturing process becomes cumbersome and/or more difficult. In addition to the size of the components, also the loads acting on the components during operation of the wind turbine increase so that the manufacturing process has to be adapted taking into account the increasing loads.

It is known to manufacture components like cover elements and/or aerodynamic elements by extrusion or by vacuum injection. These manufacturing processes have the disadvantage that they may be costly for producing larger components and that they may require a larger component thickness in order to fabricate sufficiently strong components. However, an increased thickness matching the higher loads acting on the component during operation of the wind turbine may negatively affect the aerodynamic performance of the component, for instance by steps in height, and/or its usability for attachment to a wind turbine. In addition, the increased thickness leads to an increased mass of the component, which is not desirable for attachments for a wind turbine since it may affect for instance the attachment process of the component and/or the performance of the wind turbine.

SUMMARY

An aspect relates to provide an improved wind turbine component and an improved method for manufacturing a wind turbine component.

According to embodiments of the invention, this aspect is solved by a wind turbine component as initially described, wherein the component comprises a main body with a continuous and at least partly curved surface, wherein the main body is formed by a layer stack comprising a plurality of layers, wherein at least two of the layers consist of a different material.

Forming the main body of the wind turbine component from a layer stack comprising a plurality of layers allows for adapting the properties of the component by choosing the material of the layers and/or the composition of the layer stack. This provides additional design options for adapting the component to expected external loads during operation of the wind turbine, or the component, respectively. Different layers of the layer stack of the main body may fulfill different functions, like providing a mechanical stability of the component and/or an environmental protection and/or the like.

Furthermore, a main body comprising a continuous and at least partly curved surface formed from a layer stack comprising a plurality of layers may be fabricated advantageously using a stack of multiple layers and a vacuum forming process. By providing a stack of layers, in particular planar or essentially planar layers and/or parallel or essentially parallel layers, prior to the vacuum forming, all layers can be simultaneously shaped to form the main body of the wind turbine component, in particular to form the continuous and at least partly curved surface of the main body. This facilitates in particular the fabrication of larger wind turbine components comprising a main body, in particular with a surface larger than 0.2 $m^2$, formed from a layer stack.

In addition, by the choice of the materials of the at least two layers of the layer stack, the resistance to environmental influences and/or the structural performance, or the structural properties, respectively, of the wind turbine component may be adapted advantageously to the expected loads on the component and/or under consideration of an attachment position of the wind turbine component on the wind turbine.

The wind turbine component is adapted to be attached to a wind turbine, in particular to a rotor blade of the wind turbine or to a nacelle of the wind turbine. The component may be a cover element adapted to cover at least one part of the wind turbine. It is also possible that the wind turbine component is an aerodynamic element adapted to be attached to a rotor blade of the wind turbine influencing, or in particular enhancing, the aerodynamic properties of the rotor blade.

The wind turbine component is a bearing cover for covering a main bearing of the wind turbine or the wind turbine component is an edge protection cover for covering a leading edge or a trailing edge of a rotor blade, or the wind turbine component is an aerodynamic rotor blade add-on, in particular a spoiler or a slat.

The component may be attached for instance to a nacelle of the wind turbine for covering a main bearing of the wind turbine, which supports a rotating shaft of the wind turbine connected to a rotor of the wind turbine on the nacelle, or a supporting structure of the nacelle, respectively. The component may also be a cover for covering a leading edge or a trailing edge of the rotor blade, in particular for providing a protection cover for the rotor blade, or its edges, respectively.

Alternatively, the component may be a performance-enhancing aerodynamic rotor blade add-on, which may be attached to a rotor blade to enhance its aerodynamic properties. The component may be for instance a spoiler or a slat, which can be attached for instance with at least one edge portion to a surface of the rotor blade, wherein a further portion of the component may protrude from the surface of the rotor blade in order to influence the aerodynamic properties of the rotor blade.

The layer stack comprises at least one inner layer and at least one outer layer, wherein the inner layer is embedded in an outer layer and/or in between at least two outer layers. The inner layer may be embedded in an outer layer, so that the inner layer is completely surrounded by the material forming the outer layer. It is also possible, that the inner layer is embedded between at least two outer layers, which may consist of different materials.

In an embodiment of the invention, at least one inner layer is a supporting layer and the at least one outer layer is a protective layer, wherein the material of the inner layer is more rigid than the material of the at least one outer layer. Advantageously, also a cheaper material can be used for the supporting layer reducing the cost of the component without affecting the protection provided from the protective layer. The supporting layer may provide a stable or essentially stable shape of the component during operation of the wind turbine comprising the component. The inner layer may be protected from environmental influences by the protective layer. The protective layer is in particular stable in the environment of the wind turbine, or during the operation conditions of the wind turbine, respectively.

By providing a supporting layer as an inner layer and a protective layer as an outer layer, an overall stronger component can be built due to the increased freedom of the material choice especially for the inner layer. The inner layer may consist of a material which is not stable in the environment of the wind turbine since a protection from this environment is obtained advantageously using the protective layer as at least one outer layer.

The layer stack comprises a varying thickness and/or at least one thickness gradient, in particular in a chord-wise direction and/or in a span-wise direction of the wind turbine component, and/or the layer stack comprises a tapered portion in at least one edge region of the main body, wherein the thickness of the layer stack in the tapered portion decreases towards the edge of the main body.

In particular a component, which is an aerodynamic element adapted to be attached to a rotor blade of the wind turbine, may comprise a layer stack with a varying thickness forming the main body of the component. The varying thickness of the layer stack and hence the varying thickness of the main body allows for adjusting the shape of the component to the loads acting on the component during the operation of the wind turbine. The thickness may vary in particular in a chord-wise direction and/or in a span-wise direction, wherein the chord-wise direction and the span-wise direction of the component refer to the chord-wise direction and the span-direction of a rotor blade to which the component is attached in a mounted state of the component.

An aerodynamic element may be attached to a rotor blade in such manner that a first portion of the component is fixed to the rotor blade, wherein a second portion of the component protrudes from a surface of the rotor blade. The first portion, or the attachment portion, respectively, may have a larger thickness than the second portion, or the protruding portion, respectively. It is possible that the thickness decreases continuously in the attachment portion and the protruding portion so that in particular a thickness gradient of the component is obtained. The thickness of the component may decrease at least in the protruding portion in chord-wise direction, since the loads acting on the protruding portion may decrease with increasing distance from the surface of the rotor blade, or the attachment portion, respectively.

Providing a tapered portion in at least one edge region of the main body allows for attaching the component with its edge region to the wind turbine, in particular to a rotor blade of the wind turbine and/or to a nacelle of the wind turbine. The thickness of the layer stack and hence the thickness of the main body in the tapered portion decrease towards the edge of the main body, so that by attaching the edge portion as attachment portion to the surface of the wind turbine, a smooth transition between the surface of the wind turbine, in particular a shell of a rotor blade, and the component is obtained.

The thickness of the layer stack in the tapered portion may decrease continuously towards the edge of the main body. The thickness variation and/or a thickness gradient of the component may be determined in dependence of a calculated and/or simulated stress distribution and/or in dependence of expected loads acting on the component during envisaged operational states of a wind turbine comprising the component. The varying thickness and/or the thickness gradient may be created by using one or more layers of the layer stack that exhibit a varying thickness and/or a thickness gradient, so that also a layer stack comprising one or more of such layers exhibits a varying thickness and/or a thickness gradient.

At least one of the layers of the layer stack comprises a plastic material. A layer fabricated of for instance an environmentally stable plastic material may cover for instance an inner layer, which is made of a different material, in particular a different plastic providing the shape of the main body, or of the component, respectively. It is possible that a material forming a layer of the layer stack may comprise further elements, for instance fibres, that are embedded in a matrix, or the like.

In an embodiment of the invention, the layer stack comprises at least one sensing layer, wherein the sensing layer comprises at least one electrically conductive and/or optically conductive and/or piezo-resistive material, and/or the layer stack comprises at least one active layer for changing a geometry and/or a property of the component. The sensing layer and/or the active layer may be in particular an inner layer as previously described. It is in particular possible that the sensing layer and/or the active layer is arranged next to a supporting layer as further inner layer, wherein the supporting layer and the sensing layer, or the active layer, respectively, are embedded in an outer layer and/or in between at least two outer layers.

By providing a sensing layer comprising an electrically conductive and/or optically conductive and/or piezo-resistive material, at least one property of the sensing layer may be measured, wherein a measurement value describing the property may be used as a measure for loads acting on the component during operation of a wind turbine comprising the component. Additionally or alternatively, the measurement value may be used for determination of a state of the component, for instance to detect a damaged or worn component.

By measuring for instance an electrical resistance and/or an optical absorption of the sensing layer and/or by evaluating effects like optical scattering or the like in the sensing layer, a force acting on the component during operation of the wind turbine may be determined. In addition, also a state of the component, for instance a damaged or worn component, can be detected by measuring at least one property of the sensing layer.

The provision of the sensing layer as a layer of the layer stack has the advantage that the sensing layer is integrated in the component as a sensing means so that a usage of further sensors is not necessary. Furthermore, since the sensing layer is provided as a part of the layer stack forming the main body of the component, the sensing layer may extend in the main body in particular over the entire component, or at least over a large portion of the component, respectively. Advantageously, this allows for detecting damage or wear of the component in a large area of the component, or in the entire component, respectively. The provision of the sensing layer as a part of the layer stack facilitates the manufacturing of the component since the entire main body including the sensing layer may be formed in particular in a single production step from the layer stack.

For measuring the property of the sensing layer, the sensing layer may comprise at least one contact portion protruding for instance through an outer layer covering the sensing layer at least partly, so that the sensing layer may be connected to a control unit adapted to determine at least one measurement value describing the at least one property of the sensing layer. The control unit may be a part of the wind turbine component or a part of the wind turbine, wherein in the latter case the wind turbine component is connected to the control unit for instance after attachment of the component to the wind turbine.

The sensing layer may comprise for instance a metal as an electrically conductive material and/or glass fibres as an optically conductive material. Additionally or alternatively, also a piezo-resistive material may be use as sensing layer. The material of the sensing layer may be provided as a continuous layer of the layer stack. It is also possible that the material of the sensing layer is provided in shape of a mesh or a grid and/or that the electrically and/or optically conductive and/or piezo-resistive material is embedded in a further material, for instance a plastic material and/or a resin.

By actuating the active layer, the geometry of the active layer or a property of the active layer, for instance a mechanical property like a flexibility or a rigidity may be changed. By changing the geometry of the active layer also the geometry of the component may be changed. Correspondingly, by changing a property of the active layer, also a property of the component may be changed. For example, using the active layer allows for adjusting the geometry and/or a property of the component during operation of the wind turbine, or during operation of the component, respectively. The adjustment of the component may occur for instance in dependence of the operating conditions and/or in dependence of a state of the component, for instance in dependence of a state determined using a sensing layer of the component as previously described.

The active layer may comprise for instance a piezo-electrical material, so that by applying a voltage to the active layer by an actuation arrangement of the wind turbine, or of the component, respectively, the geometry of the active layer and/or a property of the active layer may be changed. Additionally or alternatively, the active layer may comprise a heating arrangement and a material with a temperature-depending geometry and/or at least one temperature-depending property, so that the geometry and/or the property may be changed by heating the active layer using the heating arrangement of the active layer. The heating arrangement may be for instance an electrically conductive and/or an optically conductive material which is heated by applying an electric current and/or light to the heating arrangement using an actuation arrangement connected to the active layer.

A wind turbine according to embodiments of the invention comprises at least one wind turbine component according to embodiments of the invention.

According to embodiments of the invention, a method for manufacturing a wind turbine component, wherein the wind turbine component comprises a main body with a continuous and at least partly curved surface, comprises the steps:

Providing a layer stack comprising a plurality of planar or essentially planar layers, wherein at least two of the layers consist of a different material, Fabricating the main body from the layer stack, wherein the continuous and at least partly curved surface of the main body is formed in a vacuum forming process.

The layers of the plurality of planar or essentially planar layers of the layer stack may for instance be attached to at least one neighboring layer so that a stable stack is obtained. The layers may be stacked in the direction of their thicknesses, wherein a width and/or length of the layer stack may correspond to a width or a length, respectively, of the component to be manufactured. Essentially planar means that the layer may comprise a varying thickness and/or a thickness gradient in a width direction and/or a length direction of the layer, wherein the thickness is, in particular significantly, smaller than the width and/or the length of the layer so that the layer, or the layer stack comprising the layer, respectively, may be formed using the vacuum forming process.

From the layer stack, the main body of the component comprising a continuous and at least partly curved surface is fabricated in a vacuum forming process, in which the layer stack is shaped accordingly to the desired final shape of the component. In the vacuum forming process, the layer stack may be sucked in a mould using a vacuum, wherein the shape of the mould corresponds to the shape of the component to be manufactured. By the vacuum forming process, the layer stack adopts the shape of the mould so that the continuous and at least partly curved surface of the main body of the component may be formed advantageously. The stacking of the layers from the layer stack is in particular maintained during the forming of the main body in the vacuum forming process.

A layer stack comprising at least one inner layer and at least one outer layer is used, wherein the inner layer is embedded in an outer layer and/or in between at least two outer layers.

A layer stack with a supporting layer as the at least one inner layer and a protective layer as the at least one outer layer is used, wherein the material of the inner layer is more rigid than the material of the at least one outer layer.

By providing both the at least one inner layer and the at least one outer layer as a layer stack prior to the forming of the component, the fabrication of larger components in one single step is facilitated. Furthermore, by providing an inner layer and an outer layer each with a different material, stronger components can be built due to the increased freedom in choosing the materials of the inner layer and/or the outer layer. The provision of the layer stack comprising a plurality of layers for forming the component in the vacuum forming process allows for combining different materials in form of different layers to better balance the need between the costs of the manufacture and the engineering requirements, or the properties, respectively, of the wind turbine component.

A layer stack comprising a varying thickness and/or at least one thickness gradient, in particular in a chord-wise direction and/or in a span-wise direction of the wind turbine component, is used and/or a layer stack comprising a tapered portion in at least one edge region of the layer stack is used, wherein the thickness of the layer stack in the tapered portion decreases towards the edge of the layer stack, wherein the tapered portion is used to form an edge region of the main body during fabrication of the main body.

The tapered portion of the layer stack may be used to form an edge region of the main body of the wind turbine component during fabrication. As a result, also the main body formed from the layer stack comprises a tapered edge portion facilitating the fixation of the component to a surface of a wind turbine. In particular, in case of an aerodynamic element or a cover element that is attached to a rotor blade, a smooth transition between the component attached to the rotor blade and a surface of the rotor blade, or a shell of the rotor blade, respectively, is obtained.

A layer stack with at least one layer comprising a plastic material is used. A layer of an environmentally stable plastic material may form in particular an outer layer of the layer stack embedding at least partly one or more inner layers of the layer stack.

In an embodiment of the invention, a layer stack comprising at least one sensing layer is used, wherein the sensing layer comprises at least one electrically conductive and/or optically conductive and/or piezo-resistive material, and/or a layer stack comprising at least one active layer for changing a geometry and/or a property of the component is used.

The sensing layer and/or the active layer is in particular an inner layer covered by or embedded in at least one outer layer in order to protect the sensing layer from environmental influences. The sensing layer may consist of or comprise a metal and/or glass fiber structures and/or piezo-resistive material. It is possible that the material of the sensing layer is provided as a continuous layer or that the material of the sensing layer is provided as a mesh or a grid and/or that the electrically and/or optically conductive and/or piezo-resistive material is embedded in a further material, for instance a plastic material and/or a resin.

The active layer may comprise for instance a piezo-electrical material and/or a material with a temperature-depending geometry and/or at least one temperature-depending property. In the latter case, the active layer may comprise a heating arrangement, for instance an electrically conductive and/or an optically conductive material, which is provided as a continuous layer and/or as a mesh structure embedded in the active layer.

The sensing layer and/or the active layer may have at least one contact portion protruding through the at least one outer layer of the component to allow for connecting the sensing layer after fabrication of the component. A connection to the at least one sensing layer may be established for example from a control unit of a wind turbine in order to measure a physical property of the sensing layer as a measure for a load acting on the component and/or for determining a state, for instance a damaged or worn state of the component, as previously described. A connection to the active layer may be established for example from an actuator arrangement of the wind turbine in order to change the geometry and/or a property of the active layer, as previously described.

As wind turbine component, a cover element, in particular a bearing cover for covering a main bearing of the wind turbine or an edge protection cover for a leading edge or a trailing edge of a rotor blade, or an aerodynamic element, in particular an aerodynamic rotor blade add-on, especially a spoiler or a slat, is fabricated.

All details and advantages described in relation to the wind turbine component according to embodiments of the invention apply correspondingly to the wind turbine according to embodiments of the invention and to the method for manufacturing of a wind turbine blade component and vice versa.

Some of the embodiments will be described in detail, with reference to the following figures, wherein like designations denote like members, wherein.

DETAILED DESCRIPTION

Figure 1:
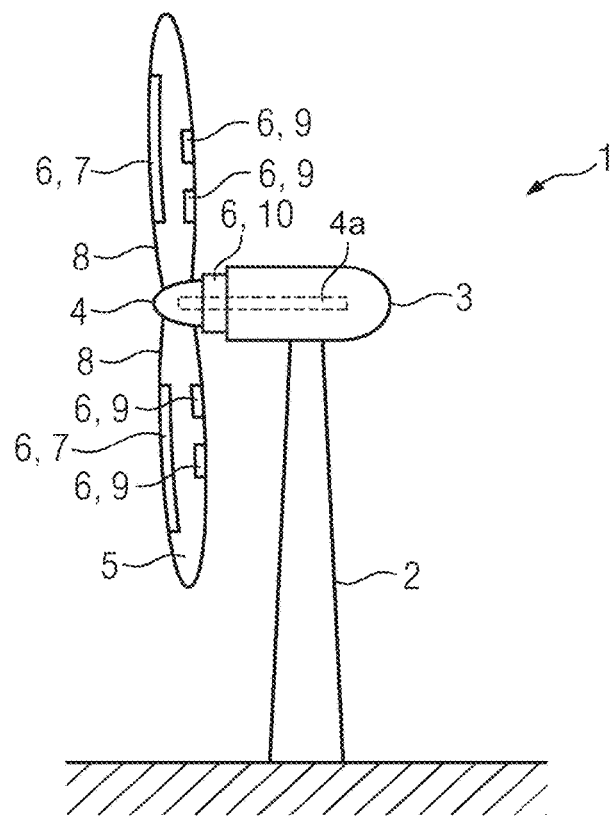
FIG. 1 shows an embodiment of a wind turbine according to the invention.

In FIG. 1, a wind turbine 1 according to embodiments of the invention is shown. The wind turbine 1 comprises a tower 2, wherein on top of the tower 2 a nacelle 3 of the wind turbine 1 is arranged. Inside the nacelle 3, a generator (not shown) of the wind turbine 1 is accommodated, wherein the generator is connected to a hub 4 of the wind turbine via a main shaft 4a of the wind turbine 1. On the hub 4, a plurality of rotor blades 5 is mounted.

On each of the rotor blades 5, a plurality of wind turbine components 6 is attached, wherein the components 6 attached to the rotor blades 5 are each a cover element 7 covering a leading edge 8 of the rotor blades 5 or an aerodynamic element 9, in particular an aerodynamic rotor blade add-on that enhances the performance of the rotor blade 5, or of the wind turbine 1, respectively. The aerodynamic elements 9 are for instance spoilers or slats mounted to a surface, or a shell, respectively, of the rotor blades 5.

One of the wind turbine components 6 is a bearing cover 10 covering a main bearing of the wind turbine 1, which supports the shaft 4a on the nacelle 3, or on a supporting structure of a nacelle 3, respectively. The bearing cover 10 is attached to the nacelle 3 of the wind turbine 1.

Each of the components 6 comprises a main body 11 formed by a layer stack 12 comprising a plurality of layers, wherein at least two of the layers consists of a different material. The components may be fabricated in an embodiment of a method for manufacturing of a wind turbine component according to embodiments of the invention described in relation to the following figures.

Figure 2:
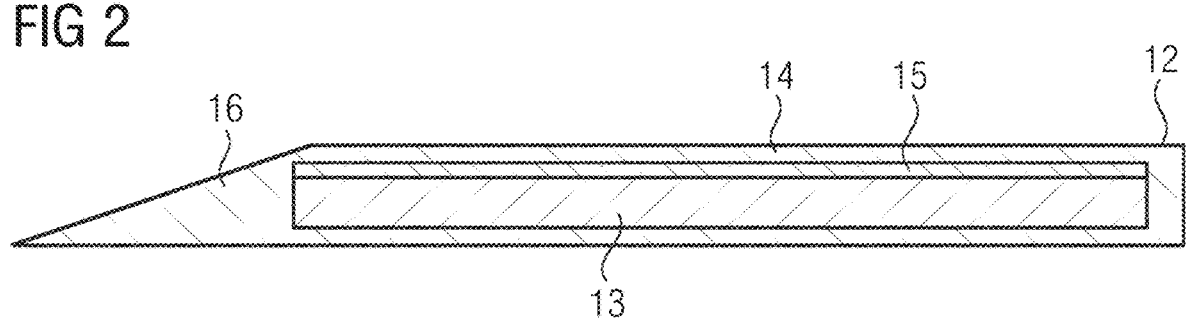
FIG. 2 shows a layer stack used for forming a main body of a wind turbine component.

In FIG. 2, a layer stack 12 for forming a main body 11 of a component 6 is shown. The layer stack 12 comprises an inner layer 13, which is embedded in an outer layer 14. The inner layer 13 is a supporting layer consisting of a material, which is more rigid than the material of the at least one outer layer 14. The inner layer 13 provides a mechanical stability and/or a shape stability of the component 6 fabricated from the layer stack 12.

Furthermore, the layer stack 12 comprises a sensing layer 15, which is also an inner layer and which is embedded in the outer layer 14. The outer layer 14 is a protective layer protecting the inner layer 13 and the sensing layer 15 from environmental influences. The inner layer 13 and the outer layer 14 consist of different materials, in particular they may each consist of a different plastic material.

The sensing layer 15 comprises at least one electrically conductive and/or optically conductive and/or piezo-resistive material. The sensing layer 15 may comprise for instance a metal or a plurality of glass fibres or glass fibres-based materials, respectively. The material of the sensing layer 15 may be provided as a planar and a continuous layer or as a mesh or a grid. The material of the sensing layer 15 may be embedded in a further material of the sensing layer 15, for instance in a plastic and/or in a resin. The sensing layer 15 may be fixed to the inner layer 13 and/or to the outer layer 14 so that a stable layer stack 12 is provided.

The layer stack 12 comprises a tilted edge portion 16, in which a thickness of the layer stack 12 decreases. From the layer stack 12, a wind turbine component 6 may be formed in a vacuum-based forming process. In this process, the layer stack 12 may be sucked in a mould using a vacuum, wherein the mould comprises a shape corresponding to the component 6 to be fabricated from the layer stack 12. During this vacuum forming process, the layer stack 12 adopts to the shape of the mould forming the main body 11 of the component 6. The planar layers of the layer stack 12 are formed in the vacuum forming process to build the main body 11 comprising a continuous and curved surface 19 of the component 6.

Figure 3:
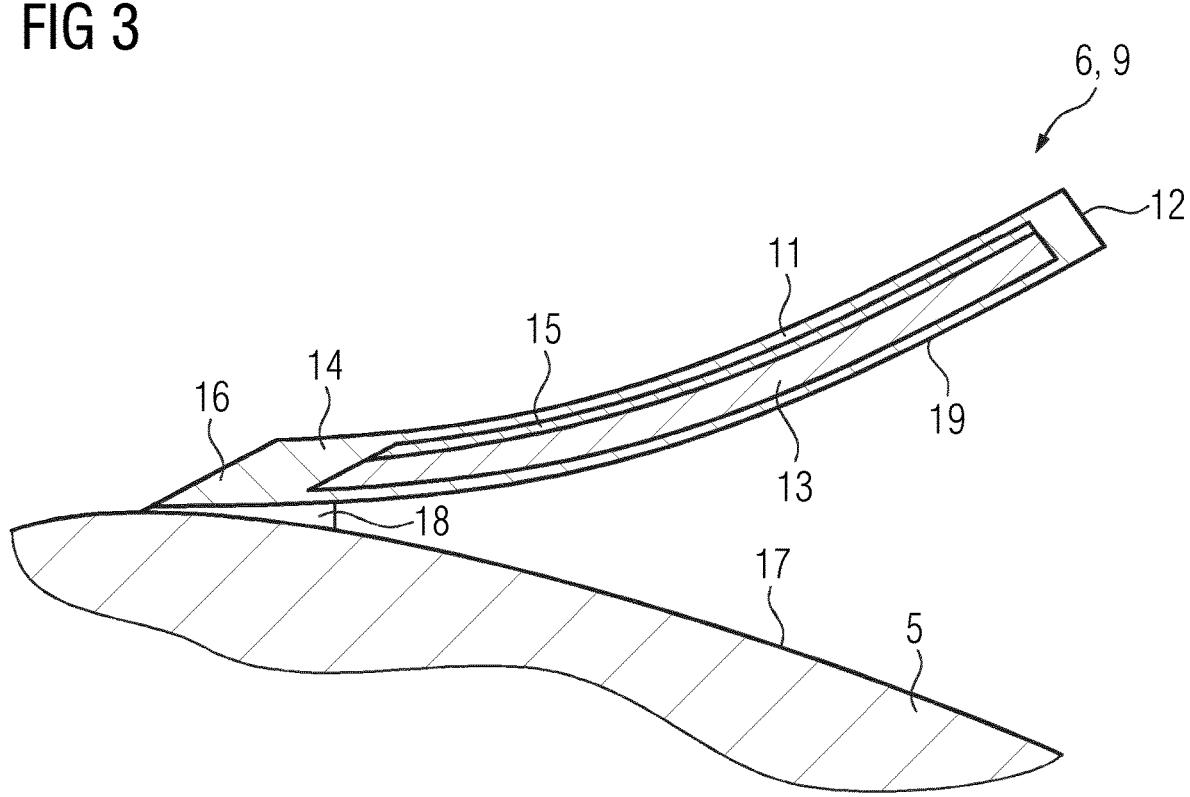
FIG. 3 shows a first embodiment of a wind turbine component according to the invention.

In FIG. 3, a wind turbine component 6 fabricated from the layer stack 12 depicted in FIG. 2 is shown. The wind turbine component 6 is an aerodynamic element 9, in particular a spoiler or a slat, which is shown attached to a surface 17 of a shell of the rotor blade 5. The attachment of the component 6 to the surface 17 of the rotor blade 5 may occur for instance using fastening means and/or one or more adhesive layers 18 fixating the component 6 to the surface 17.

From the tilted portion 16 of the layer stack 12, an edge region of the main body 11 is formed during manufacturing of the component 6. By providing the tilted edge portion 16 of the layer 12, also a tilted edge portion of the component 6, or of its main body 11, respectively, is obtained enabling a smooth transition between the surface 17 of the rotor blade 5 and the component 6. In particular, a height of the component 6, or its thickness, respectively, in a portion directed to the leading 8 of the rotor blade 5 in a mounted state of the component 6 may be reduced advantageously.

Figure 4:
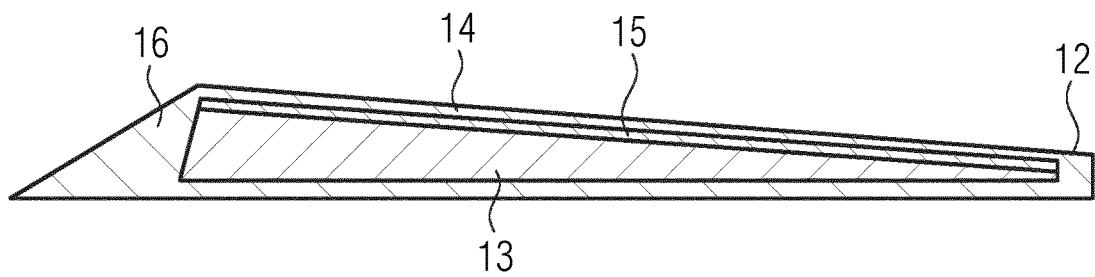
FIG. 4 shows a second layer stack used for forming a main body of a wind turbine component.

In FIG. 4, a second embodiment of the layer stack 12 for forming a main body 11 of a component 6 is shown. In this embodiment, the layer stack 12 comprises an additional thickness gradient in a chord-wise direction of the wind turbine component 6. From this layer stack 12, a wind turbine component with a reduced thickness in a chord-wise direction is formed. The chord-wise direction of the component 6 refers to the chord-wise direction of the rotor blade 5 to which the component 6 is mounted in such manner, that one of the dimensions of the components extends parallelly to the chord-wise direction of the rotor blade 5, so that this dimension forms the chord-wise direction of the component 6. In FIG. 4, the chord-wise direction of the component 6 extends from left to right, or from right to left, respectively. By providing the layer stack 12 with at least one thickness gradient in chord-wise direction, the shape of the component 6 formed from the layer stack 12 may be adapted to loads acting on the component 6 during operation of the wind turbine 1.

Figure 5:
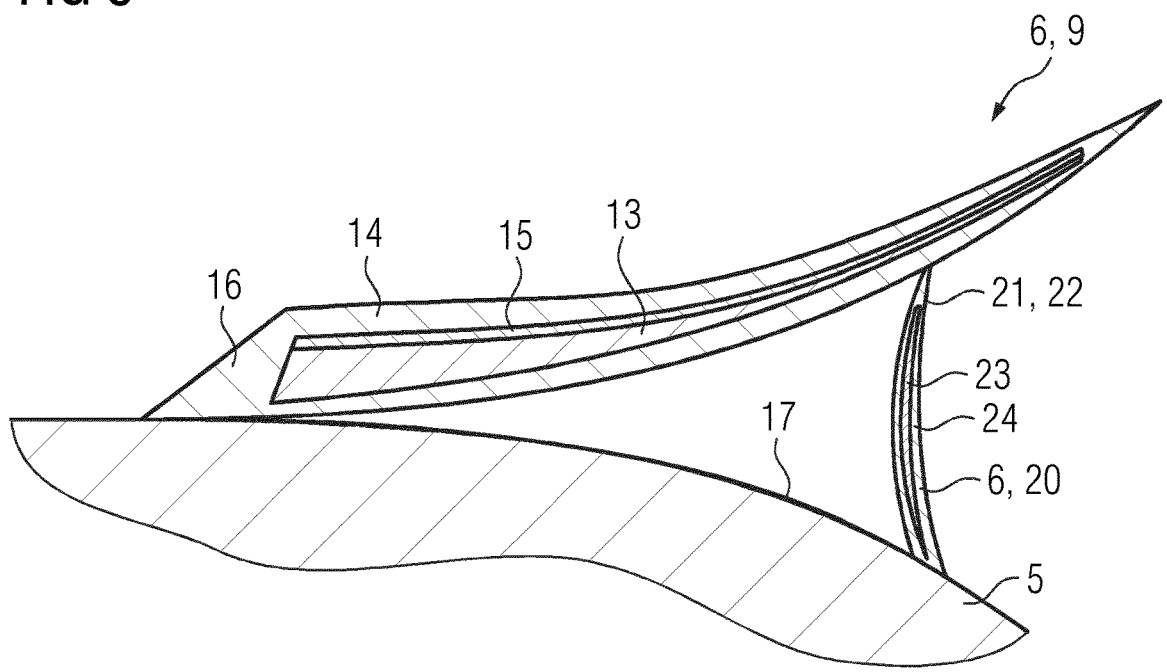
FIG. 5 shows a second embodiment of a wind turbine component according to the invention.

As depicted in FIG. 5, from the layer stack 12 shown in FIG. 4, an aerodynamic element 9 is formed as previously described, wherein the thickness of the aerodynamic element 9 decreases in chord-wise direction, in particular in a portion of the component 6 which protrudes from the surface 17 of the rotor blade 5.

The protruding portion of the aerodynamic element 9 is supported on the surface 17 of the rotor blade by a further aerodynamic element 20, wherein the further aerodynamic element 20 influences the aerodynamic properties of the aerodynamic element 9. The further aerodynamic element 20 comprises a main body 21 with a continuous and at least partly curved surface, wherein the main body 21 is formed from a layer stack 22 comprising an inner layer 23 and an outer layer 24. Also, the further component 20 may be manufactured from the layer stack 22 as previously described. It is possible that also the further aerodynamic element 20 comprises a sensing layer. Besides aerodynamic elements 9, 20 also protective cover elements like the bearing cover 10 or edge protection covers 7 may be fabricated.

Figure 6:
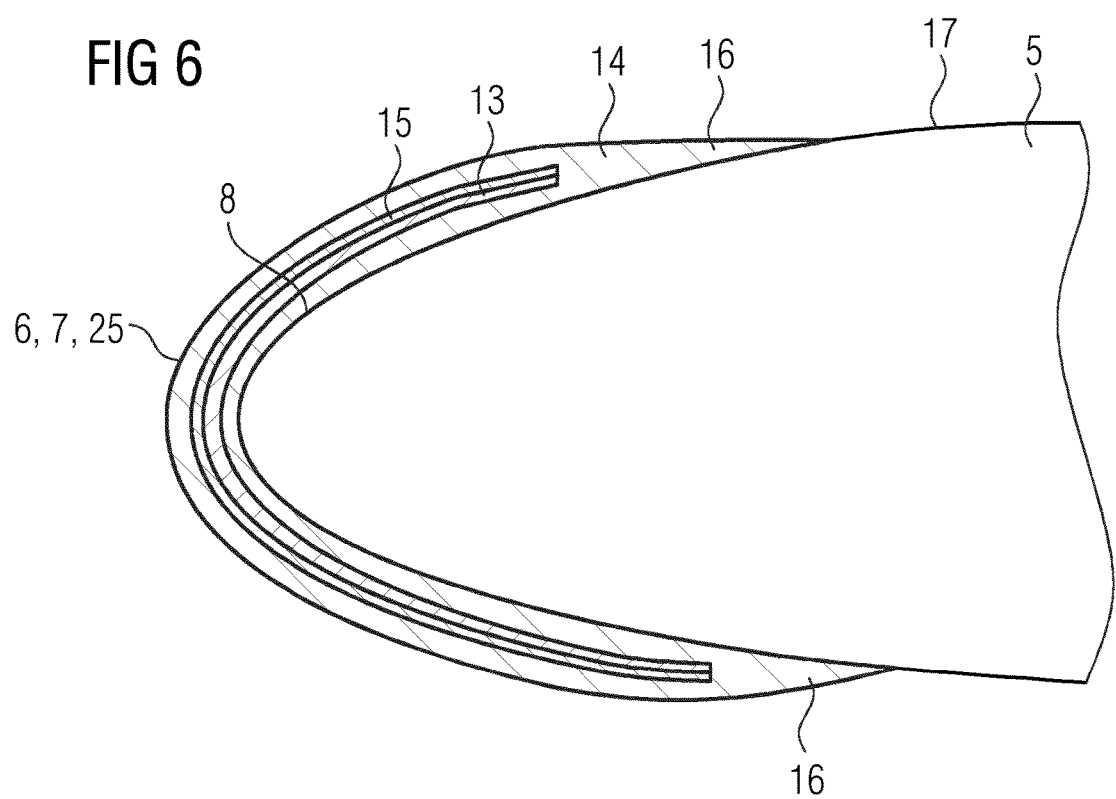
FIG. 6 shows a third embodiment of a wind turbine component according to the invention.

In FIG. 6, a component 6 forming a cover element 7, which is an edge protection cover 25, is shown attached to the leading edge 8 of a rotor blade 5. Also, the cover element 7 is fabricated from a layer stack 12 comprising an inner layer 13, an outer layer 14 and a sensing layer 15 as previously described in correspondence to the aerodynamic elements 9. The layer stack 12, or the cover element 7, respectively, comprises two tilted edge sections 16 allowing for a smooth transition between the cover element 7 and the surface 17 of the rotor blade 5. Alternatively, the edge protection cover 25 may be a trailing edge cover covering a trailing edge of the rotor blade 5.

In all embodiments, the sensing layer 15 may comprise a contact portion protruding the outer layer 14, so that the sensing layer 15 may be connected to a control unit of the component 6, or of the wind turbine 1, respectively. The control unit may be adapted to measure at least one physical property of the sensing layer 15, for instance an electrical resistance, an optical absorption, optical scattering or the like, in order to determine a load acting on the component and/or a state of the component 6. This allows for instance to detect operational states, in which the load acting on the component 6 is too high and/or to detect a component 6 that has been damaged or worn during operation.

In all embodiments, it is possible that the inner layers 13, 23 and/or the sensor layer 15 are embedded between two outer layers 14, 24 each consisting of a different material. This allows further adapting the characteristics of the components 6 to their use-case in the wind turbine 1. In all embodiments, the layer stacks 12, 22, or the components 6, 20 respectively, may comprise a varying thickness and/or a thickness gradient in span-wise direction, which is orthogonal to the drawing plane in FIG. 2 to 6.

In all embodiments, an active layer may be used as an alternative to the sensing layer 15 or in addition to the sensing layer 15. The active layer may be arranged as an inner layer or as an outer layer of a layer stack 12, 22. It is also possible that the active layer and/or the sensing layer 15 and/or further layers of a layer stack 12, 22 are stacked one on top of another in different orders.

By actuating an active layer in the layer stack 12, 22, the geometry of the active layer or a property of the active layer, for instance a mechanical property like a flexibility or a rigidity may be changed. By changing the geometry of the active layer, also the geometry of the component 6 may be changed. Correspondingly, by changing a property of the active layer, also a property of the component 6 may be changed.

Using the active layer allows for adjusting the geometry and/or a property of the component 6 during operation of the wind turbine 1, or during operation of the component 6, respectively. The adjustment of the component 6 may occur for instance in dependence of the operating conditions and/or in dependence of a state of the component 6, for instance in dependence of a state determined using a sensing layer 15 of the component 6 as previously described.

The active layer may comprise for instance a piezo-electrical material, so that by applying a voltage to the active layer by an actuation arrangement of the wind turbine 1, the geometry of the active layer and/or a property of the active layer may be changed. Additionally or alternatively, the active layer may comprise a heating arrangement and a material with a temperature-depending geometry and/or at least one temperature-depending property, so that the geometry and/or the property may be changed by heating the active layer using the heating arrangement of the active layer. The heating arrangement may be for instance an electrically conductive and/or an optically conductive material which is heated by applying an electric current and/or light to the heating arrangement using an actuation arrangement connected to the active layer.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for manufacturing of a wind turbine component, wherein the wind turbine component comprises a main body with a continuous and at least partly curved surface, comprising the steps of:
   providing a layer stack comprising a plurality of planar or substantially planar layers,
   wherein at least two of the layers are of a different material,
   wherein the layer stack comprises at least one inner layer and at least one outer layer,
   wherein at least one sensing layer and/or at least one active layer is provided between the at least one inner layer and the at least one outer layer, and wherein the at least one sensing layer and/or the at least one active layer and the at least one inner layer are embedded within and completely surrounded by the at least one outer layer,
   fabricating the main body from the layer stack, wherein the continuous and at least partly curved surface of the main body is formed in a vacuum forming process;
   providing the wind turbine component as a cover element; and
   providing the cover element as a bearing cover for covering a main bearing of a wind turbine or an edge protection cover for a leading edge or a trailing edge of a rotor blade.

2. The method according to claim 1, further comprising providing the layer stack with a supporting layer as the at least one inner layer and a protective layer as the at least one outer layer, wherein the material of the at least one inner layer is more rigid than the material of the at least one outer layer.

3. The method according to claim 1, further comprising providing the layer stack with at least one layer of a varying thickness and/or at least one thickness gradient, which is in at least one of a chord-wise direction and/or in a span-wise direction of the wind turbine component, and/or providing the layer stack with a tapered portion in at least one edge region of the layer stack, wherein the thickness of the layer stack in the tapered portion decreases towards the at least one edge region of the layer stack, wherein the tapered portion provides the at least one edge region of the main body during fabrication of the main body.

4. The method according to claim 1, further comprising providing the layer stack with at least one layer comprising a plastic material.

5. The method according to claim 1, further comprising providing the at least one sensing layer with at least one electrically conductive and/or optically conductive and/or piezo-resistive material, and/or wherein the at least one active layer changes a geometry and/or a property of the wind turbine component.

* * * * *